(12) United States Patent (10) Patent No.: US 12,668,122 B2

Katsuyama (45) Date of Patent: Jun. 30, 2026

(54) DRIVING FORCE CONTROL DEVICE

(71) Applicant: TOYOTA JIDOSHA KABUSHIKI KAISHA, Toyota (JP)

(72) Inventor: Etsuo Katsuyama, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/649,463

(22) Filed: Apr. 29, 2024

(65) Prior Publication Data

US 2024/0383331 A1 Nov. 21, 2024

(30) Foreign Application Priority Data

May 19, 2023 (JP) .................................. 2023-083129

(51) Int. Cl.
B60K 23/08 (2006.01)

(52) U.S. Cl.
CPC ................................. B60K 23/0808 (2013.01)

(58) Field of Classification Search
CPC ...... B60K 23/0808; B60K 6/00; B60K 23/00; B60K 23/08; B60K 1/02; B60L 15/20; B60L 7/10; B60L 7/18; B60L 15/2009; B60L 15/32; B60L 2210/10; B60L 2240/12

See application file for complete search history.

(56) References Cited

U.S. PATENT DOCUMENTS

| | | | | |
|---|---|---|---|---|
| 9,527,510 B2 * | 12/2016 | Katsuyama | ........... | B60W 30/18 |
| 10,196,057 B2 * | 2/2019 | Katsuyama | ......... | B60T 8/17551 |
| 10,787,167 B2 * | 9/2020 | Nasu | ........................ | B60K 1/02 |
| 2006/0015238 A1 | 1/2006 | Motoyama | | |

FOREIGN PATENT DOCUMENTS

| | | | | |
|---|---|---|---|---|
| EP | 0576044 B1 * | 11/1996 | ............... | B62D 6/04 |
| JP | 2006-29460 A | 2/2006 | | |
| WO | WO-2012028930 A2 * | 3/2012 | .......... | B60W 30/045 |

* cited by examiner

*Primary Examiner* — Adam R Mott

*Assistant Examiner* — Abigail Lee Espinoza

(74) *Attorney, Agent, or Firm* — Sughrue Mion, PLLC

(57) ABSTRACT

A driving force control device for separately controlling a driving force of drive wheels is configured to: acquire a detection value of a steering angle, a speed of the drive wheels, and a speed of the vehicle; set a driving force generated in each drive wheel; control the driving force of each drive wheel so as to become a set driving force; and set a driving force to be generated in at least one pair of the drive wheels, based on a value calculated by multiplying a difference between a speed difference between the a pair of drive wheels corresponding to a target yaw rate estimated from the steering angle and the speed of the vehicle and an acquired speed difference between the one pair of drive wheels by a coefficient based on at least one of a cornering stiffness and a driving stiffness of each drive wheel.

4 Claims, 5 Drawing Sheets

START

S11
OBTAIN VARIOUS
PARAMETER VALUES

S12
SET DRIVING FORCE TO BE GENERATED
FOR EACH DRIVING WHEEL

S13
CONTROL DRIVING FORCE OF
EACH DRIVING WHEEL SO AS TO BE
SET DRIVING FORCE

END

DRIVING FORCE CONTROL DEVICE

FIELD

The present disclosure relates to a driving force control device.

BACKGROUND

Conventionally, a driving force control device capable of adjusting the distribution of the driving force transmitted to the left and right rear wheels of a vehicle has been known (JP2006-029460A). The driving force control device described in JP2006-029460A is configured to perform a first control for controlling the distribution of the driving force so that the wheel speed difference between the left and right rear wheels becomes the target wheel speed difference corresponding to the traveling state of the vehicle, and a second control for controlling the distribution of the driving force so that the yaw momentum generated in the vehicle becomes the target yaw momentum corresponding to the traveling state of the vehicle.

SUMMARY

In the control device described in JP2006-029460A, both the first control and the second control are feedback-controlled. Here, in order to perform feedback control, it is necessary to set the feedback gain to an appropriate value. However, since an appropriate feedback gain is not theoretically derived in JP2006-029460A, an enormous number of calibration operations are required to set the feedback gain to an appropriate value.

In view of the above problems, an object of the present disclosure is to reduce the number of man-hours required for the calibration operations in setting the driving force of the drive wheels.

The gist of the present disclosure is as follows.

(1) A driving force control device for separately controlling a driving force of at least one pair of drive wheels of a vehicle, comprising:

an acquisition unit for acquiring a detection value or an estimated value of a steering angle of the vehicle, a speed of each wheel including the drive wheels, and a speed of the vehicle;

a driving force setting unit for setting a driving force generated in each drive wheel; and a control unit for controlling the driving force of each drive wheel so as to become a set driving force, wherein the driving force setting unit sets a driving force to be generated in at least one pair of the drive wheels, based on a calculated value calculated by multiplying a difference between a speed difference between the at least one pair of drive wheels corresponding to a target yaw rate estimated from the steering angle and the speed of the vehicle acquired by the acquisition unit and a speed difference between the one pair of drive wheels acquired by the acquisition unit by a coefficient based on at least one of a cornering stiffness and a driving stiffness of each drive wheel.

(2) The driving force control device according to above (1), wherein the acquisition unit further acquires a detection value or an estimated value of a load applied to each wheel, and the driving force setting unit sets the driving force to be generated in the at least one pair of drive wheels, based on a value obtained by distributing the driver required driving force in proportion to a load applied to each of the wheels and the calculated value.

(3) The driving force control device according to above (1) or (2), wherein the coefficient is a value between the cornering stiffness and the driving stiffness.

(4) The driving force control device according to any one of above (1) to (3), wherein the driving stiffness is set on the basis of a load applied to each wheel and a slip ratio.

(5) The driving force control device according to any one of above (1) to (4), wherein the driving force setting unit calculates the driving force $F_{xn}$ of the drive wheels based on the following equation (1):

$$F_{xn} = \frac{w_n}{w}F_d \pm K_n\left(\frac{\frac{v_{wn'} - v_{wn}}{2}}{V} - \frac{\frac{t}{2}r'}{V}\right) \tag{1}$$

in the above equation (1), w represents the weight of the vehicle, $w_n$ represents the load applied to a n-th drive wheel, $F_d$ represents the driving force required by the driver, $v_{wn}$ represents a speed of the n-th drive wheel, $v_{wn'}$ represents a speed of the drive wheel which is a pair with the n-th drive wheel, or the speed of the vehicle, V represents a speed of the vehicle, t represents a tread between the pair of drive wheels, and $K_n$ represents a coefficient which varies according to at least one of a cornering stiffness and a driving stiffness of the n-th wheel.

DESCRIPTION OF EMBODIMENTS

Figure 1:
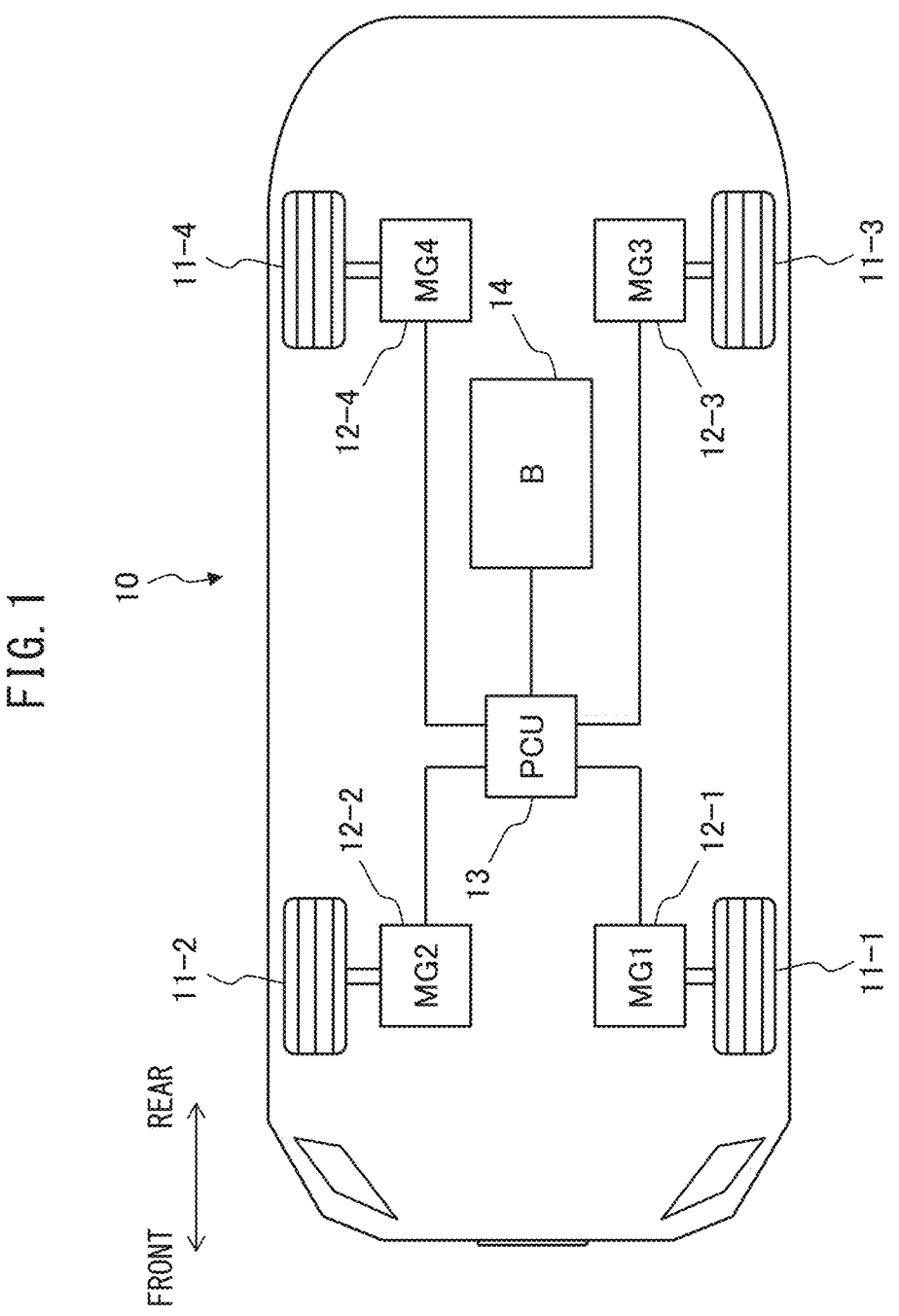
FIG. 1 is a configuration diagram schematically illustrating a vehicle.

Hereinafter, embodiments will be described in detail with reference to the drawings. In the following description, the same reference numerals are given to the same constituent elements.

Configuration of Vehicle

First, the vehicle 10 on which a driving force control system 1 according to one embodiment is mounted will be described with reference to FIG. 1. FIG. 1 is a configuration diagram schematically showing a vehicle 10. As shown in FIG. 1, the vehicle 10 includes drive wheels 11 (11-1 to 11-4), an electric motor 12 (12-1 to 12-4), a power control unit (PCU) 13, and a battery 14.

The drive wheels 11 are wheels driven by corresponding electric motors 12. In the present embodiment, the vehicle 10 has four drive wheels 11. Specifically, the vehicle 10 includes a first drive wheel 11-1 on the front left side, a second drive wheel 11-2 on the front right side, a third drive wheel 11-3 on the rear left side, and a fourth drive wheel 11-4 on the rear right side.

In the present embodiment, as long as there are at least one pair of drive wheels 11 arranged side by side in the lateral direction (left-right direction) with respect to the front-rear direction of the vehicle 10, all four wheels may not be the drive wheels 11. Thus, for example, a pair of rear wheels may be the drive wheels 11 and a pair of front wheels may not be the drive wheels 11, or a pair of front wheels may be the drive wheels 11 and a pair of rear wheels may not be the drive wheels 11. Further, the vehicle 10 may have two or more pairs of drive wheels.

The electric motor 12 drives the corresponding drive wheels 11. In addition, the electric motor 12 may perform regenerative power generation by power from each of the drive wheels 11. In the present embodiment, one electric motor 12 is connected to one drive wheel 11, and each drive wheel 11 is driven by a corresponding electric motor 12. Specifically, the first drive wheel 11-1 is connected to the first electric motor 12-1, the second drive wheel 11-2 is connected to the second electric motor 12-2, the third drive wheel 11-3 is connected to the third electric motor 12-3, and the fourth drive wheel 11-4 is connected to the fourth electric motor 12-4. Therefore, in the present embodiment, the driving force of each of the drive wheels 11 is separately controlled. Note that the electric motor 12 may be a motor generator capable of performing regenerative power generation as long as it can drive the corresponding drive wheels 11. In addition, when some of the wheels are not drive wheels, the electric motor 12 may not be connected to the wheels that are not drive wheels.

In the present embodiment, one electric motor 12 is connected to one drive wheel 11, but one electric motor 12 may be connected to two or more drive wheels 11. In this case, a driving force distribution device is provided between the drive wheels 11 and the electric motor 12, and the driving force is adjusted for each drive wheel 11 by the driving force distribution device. Therefore, even in this case, the driving force of at least one pair of drive wheels 11 is separately controlled. Further, in the present embodiment, the electric motor 12 is used as the drive device, but other devices such as an internal combustion engine may be used as the drive device. Even when an internal combustion engine is used as the drive device, the driving force of at least one pair of drive wheels 11 is separately controlled by the driving force distribution device.

the PCU 13 is electrically connected to the electric motors 12 and the battery 14. The PCU 13 includes inverters, DCDC converters, and the like. The PCU 13 controls the electric power supplied to the electric motors 12 to control the driving force of the drive wheels 11 connected to the electric motors 12. Further, the PCU 13 converts electric power supplied from the battery 14 to the electric motor 12. When the electric motor 12 can perform regenerative power generation, the PCU 13 converts the electric power supplied from the electric motor 12 to the battery 14.

The battery 14 is electrically connected to the PCU 13. The battery 14 supplies electric power to the electric motors 12 via the PCU 13 when driving the vehicles 10. The battery 14 is charged by being connected to an external charging facility. In addition, when the electric motor 12 is capable of regenerative power generation, the battery 14 is charged by electric power generated by the electric motor 12.

Configuration of Driving Force Control System

Figure 2:
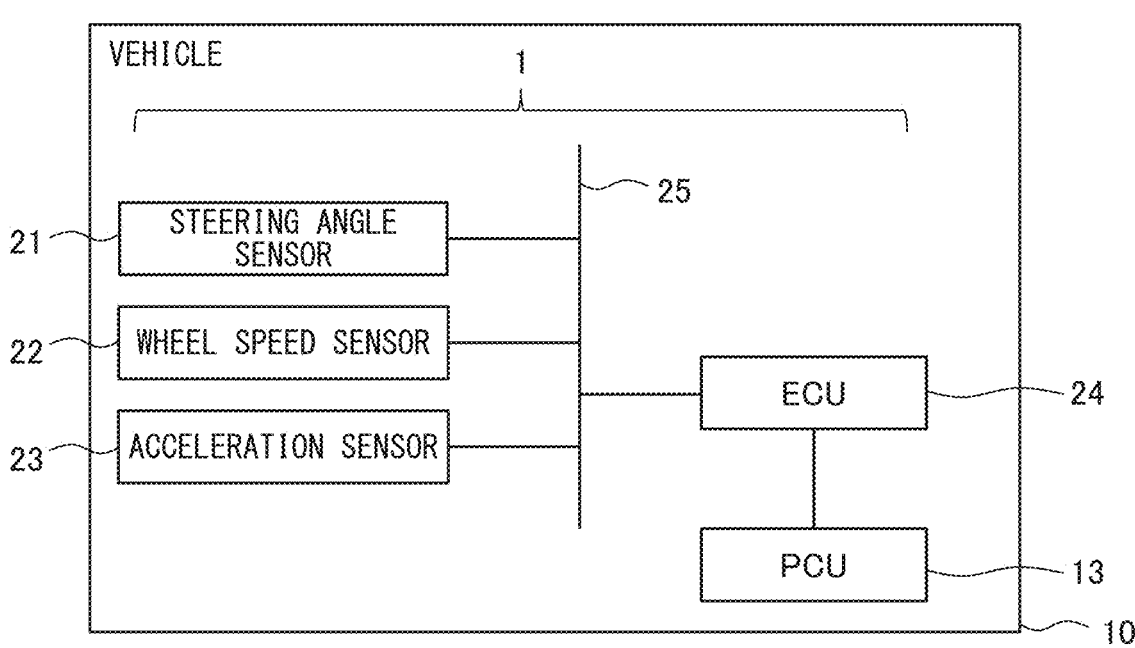
FIG. 2 is a block diagram schematically illustrating a configuration of a driving force control system.

Next, the driving force control system 1 according to one embodiment will be described with reference to FIG. 2. FIG. 2 is a block diagram schematically illustrating a configuration of the driving force control system 1. As illustrated in FIG. 2, the driving force control device 1 includes a steering angle sensor 21, a wheel speed sensor 22, an acceleration sensor 23, and an electronic control unit (ECU) 24. The steering angle sensor 21, the wheel speed sensor 22, the acceleration sensor 23, and the ECU 24 are communicably connected via an in-vehicle network 25 compliant with standards such as CAN. The ECU 24 is connected to the PCU 13 via a signal line.

The steering angle sensor 21 detects the steering angle of the front wheels of the vehicle 10. In the present embodiment, the steering angle sensor is attached to a steering wheel (not shown), and detects a steering angle by detecting an angle at which the steering wheel is rotated. The steering angle sensor 21 is inputted to the ECU 24 via the in-vehicle network 25.

The wheel speed sensor 22 detects the rotational speed of each wheel (each drive wheel 11). In the present embodiment, the wheel speed sensor 22 is constituted by a rotor on a gear provided on a shaft connected to each wheel, and a magnetic flux sensor that detects a magnetic flux that changes as the rotor rotates, and detects the rotational speed of each wheel based on the detected magnetic flux. However, the wheel speed sensor 22 may be any type of sensor as long as the rotational speed of each wheel can be detected. The output of the wheel speed sensor 22 is input to the ECU 24 via the in-vehicle network 25.

The acceleration sensor 23 detects an acceleration generated in the vehicle 10. In the present embodiment, the acceleration in the front-rear direction of the vehicle 10 and the acceleration in the lateral direction (a direction perpendicular to the front-rear direction) of the vehicle 10 can be separately measured. As the acceleration sensor 23, any type of sensor can be used. The output of the acceleration sensor 23 is input to the ECU 24 via the in-vehicle network 25.

The ECU 24 controls the operation of various actuators such as the PCU 13 of the vehicle 10. In particular, in the present embodiment, the ECU 24 functions as a driving force control device that controls the driving force of at least one pair of drive wheels of the vehicle 10. In the present embodiment, the driving force control system 1 has one ECU 24 functioning as a driving force control device, but may have a plurality of ECUs 24 functioning as a driving force control device.

Figure 3:
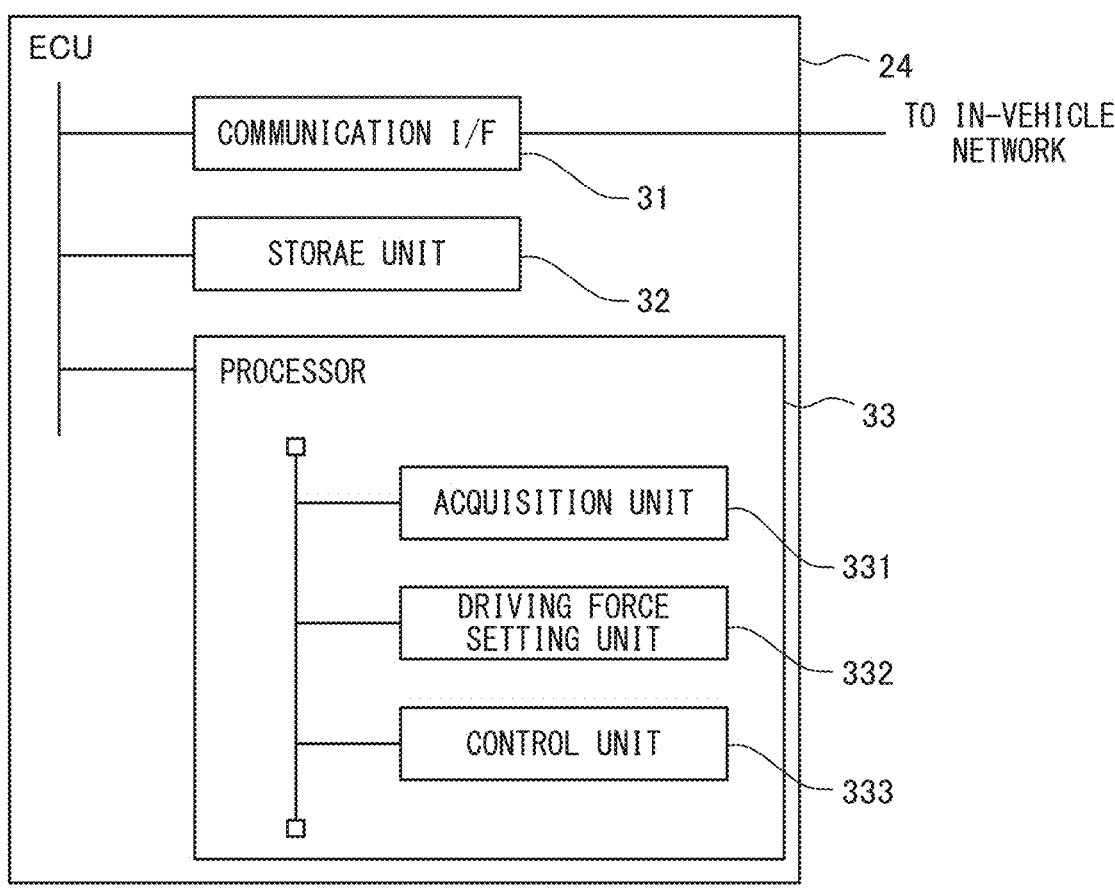
FIG. 3 is a configuration diagram schematically illustrating a configuration of a ECU.

FIG. 3 is a configuration diagram schematically illustrating a configuration of the ECU 24. As illustrated in FIG. 3, the ECU 24 includes a communication interface 31, a storage unit 32, and a processor 33. Note that the communication interface 31, the storage unit 32, and the processor 33 may be separate circuits or may be configured as one integrated circuit.

The communication interface 31 includes a communication interface circuit and a device interface circuit. The communication interface circuit is a circuit for connecting the ECU 24 to the in-vehicle network 25. The device interface circuit is a circuit for outputting a control signal to a vehicular actuator such as the PCU 13. The communication interface 31 transmits signals received from the steering angle sensor 21, the wheel speed sensor 22, and the acceleration sensor 23 to the processor 33. The communication interface 31 transmits the signal outputted from the processor 33 to a vehicular actuator such as the PCU 13.

The storage unit 32 stores data. The storage unit 32 includes, for example, at least one of a volatile semiconductor memory, a nonvolatile semiconductor memory, a hard disk drive (HDD), and a solid state drive (SSD). The storage unit 32 stores a program to be executed by the processor 33 of the ECU 24.

The processor 33 has one or more CPU (Central Processing Unit) and its peripheral circuitry. The processor 33 may further include other arithmetic circuits such as a logical arithmetic unit or a numerical arithmetic unit. The processor 33 executes a program stored in the storage unit 32.

As illustrated in FIG. 3, the processor 33 includes an acquisition unit 331, a driving force setting unit 332, and a control unit 333. The acquisition unit 331 acquires a detection value or an estimated value of the steering angle of the vehicle 10, the speed of each of the drive wheels 11 (including the non-drive wheels when there are non-drive wheels), and the speed of the vehicle 10. The driving force setting unit 332 sets a driving force to be generated in each of the drive wheels 11. The control unit 333 controls the driving force of each of the drive wheels 11 so that the driving force becomes the driving force set by the driving force setting unit 332. These units included in the processor 33 are, for example, functional modules realized by a computer program running on the processor 33. Alternatively, each unit included in the processor 33 may be a dedicated arithmetic circuit provided in the processor 33.

Outline of Processing for Setting the Driving Force of Each Wheel

Figure 4A:
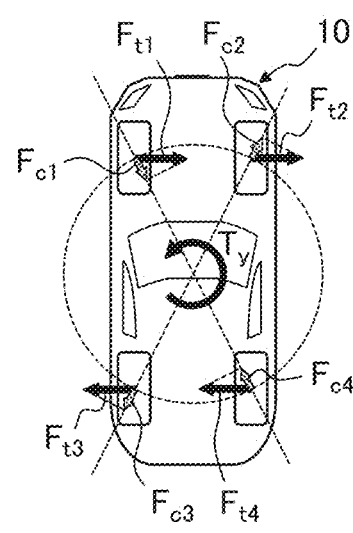
FIGS. 4A to 4C are diagrams illustrating a force applied to each wheel when there is a disturbance input in the yaw direction of the vehicle.
Figure 4B:
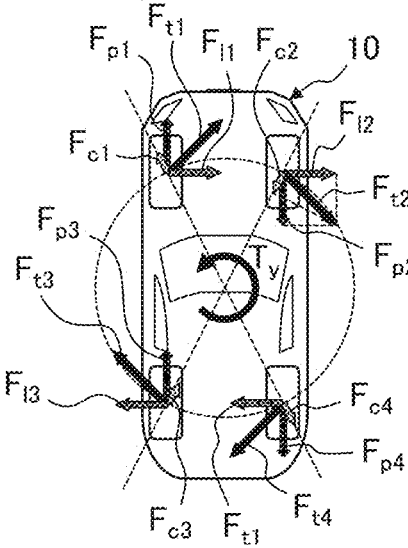
Figure 4C:
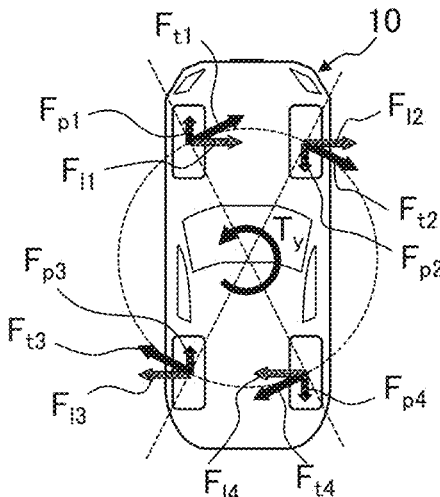

Next, the driving force setting process according to the present embodiment will be conceptually described with reference to FIGS. 4A to 4C. FIGS. 4A to 4C are diagrams illustrating a force applied to wheels when a yaw-direction disturbance-input $T_y$ is applied to the vehicle 10. As shown in FIGS. 4A to 4C, a force in the opposite direction acts on the respective wheels with respect to the disturbance-input $T_y$ in the yaw direction. Note that FIGS. 4A to 4C show a case where there is a counterclockwise disturbance-input $T_y$, but similar force acts on the wheels even when the vehicles 10 turn clockwise. In addition, the driving force in FIGS. 4A to 4C are drawn by ignoring driving force (force in the front-rear direction, hereinafter also referred to as "driver required driving force") applied uniformly or in an arbitrary distribution to all wheels required by the driver by an accelerator pedal or the like.

FIG. 4A illustrates a case in which the driving force in the front-rear direction and the lateral force for the steady turning are not generated in each wheel other than the driver required driving force. In this case, the force $F_t$ ($F_{t1}$ to $F_{t4}$) generated in the respective wheels is only a lateral force that opposes the disturbance-input $T_y$ in the yaw direction. When the lateral force is decomposed into a component in a tangential direction with respect to the rotational direction of the vehicle 10 (a direction along a circle indicated by a broken line in FIGS. 4A to 4C) and a component $F_c$ ($F_{c1}$ to $F_{c4}$ in a diagonal wheel direction, components $F_c$ in a diagonal wheel direction in opposite directions are generated in the wheels located diagonally, and the components $F_c$ in the diagonal wheel direction cancel each other out. That is, when the driving force in the front-rear direction is not generated other than the driver required driving force, a useless force that cancels each other between diagonal wheels is generated in each wheel.

FIG. 4B shows a case where a yaw moment due to a relatively large driving force is generated in each wheel other than the driver required driving force. In this case, the force $F_t$ ($F_{t1}$ to $F_{t4}$) generated in each wheel is the resultant force of the lateral force $F_l$ ($F_{l1}$ to $F_{l4}$ applied to each wheel in order to oppose the disturbance-input $T_y$ in the yaw direction and the driving force $F_p$ ($F_{p1}$ to $F_{p4}$ applied to each wheel. When the force generated in the respective wheels is decomposed into a component in the tangential direction with respect to the rotational direction of the vehicle 10 and a component $F_c$ ($F_{c1}$ to $F_{c4}$ in the diagonal wheel direction, components $F_c$ in the diagonal wheel direction in opposite directions are generated in the wheels located diagonally, and the components $F_c$ in the diagonal wheel direction cancel each other out. That is, in the case where a relatively large driving force in the front-rear direction is generated other than the driver required driving force, a useless force that cancels each other between the diagonal wheels is generated in each wheel.

FIG. 4C illustrates a case where an appropriate driving force is generated for each wheel other than the driver required driving force. Even in this case, the force $F_t$ ($F_{t1}$ to $F_{t4}$) generated in each wheel is the resultant force of the lateral force $F_l$ ($F_{l1}$ to $F_{l4}$ applied to each wheel in order to oppose the disturbance-input $T_y$ in the yaw direction and the driving force $F_p$ ($F_{p1}$ to $F_{p4}$ applied to each wheel. Here, in the embodiment illustrated in FIG. 4C, the force $F_t$ generated in the respective wheels acts in a tangential direction with respect to the rotational direction of the vehicles 10. Therefore, no component in the diagonal wheel direction is generated in each wheel, and thus no wasteful force is generated in each wheel to cancel each other in the diagonal wheels. In order to do so, in addition to the driver required driving force, the driving force generated in each wheel needs to be set so that the force generated in each wheel acts in a tangential direction with respect to the rotational direction of the vehicle 10 as shown in FIG. 4C. Therefore, the driving force control device according to the present embodiment sets the driving force generated in each of the drive wheels 11 such that the resultant force of the relative driving force of each of the drive wheels 11 of the vehicle 10 with respect to the other drive wheels and the relative lateral force applied to the drive wheels with respect to the other drive wheels is directed in the tangential direction with respect to the rotation direction (turning direction) of the vehicle 10.

Driving Force Generated for Each Drive Wheel

Figure 5:
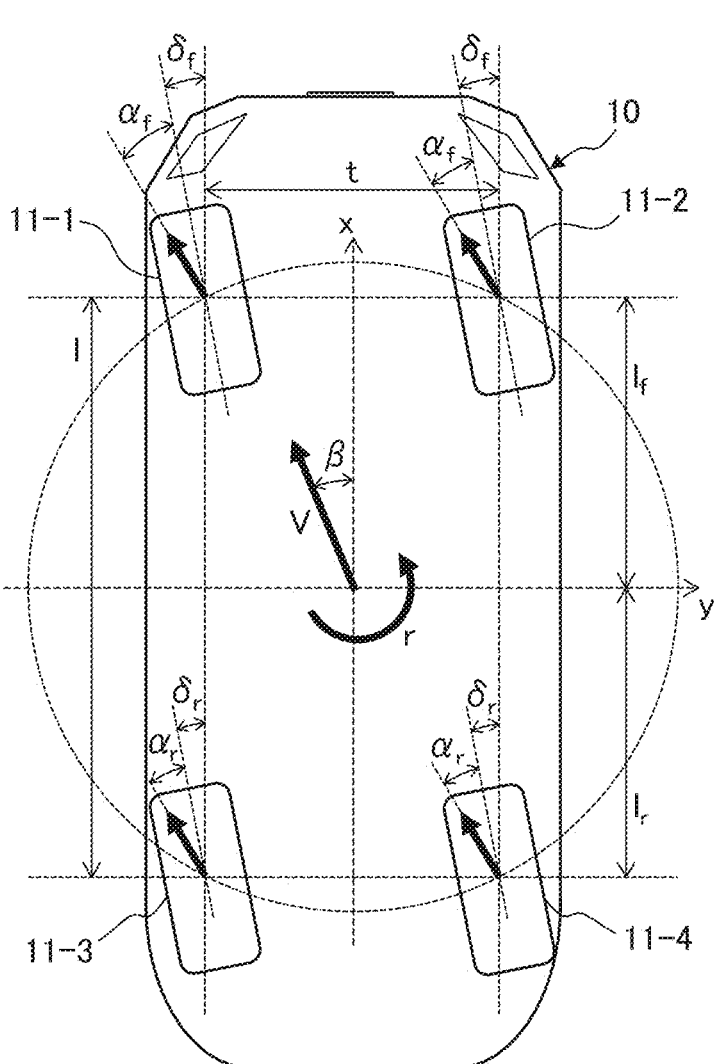
FIG. 5 is a diagram schematically illustrating a simple model of a vehicle.

Next, with reference to FIG. 5, a method of setting the driving force generated in each of the drive wheels 11 will be described. FIG. 5 is a diagram schematically illustrating a simple model of the vehicle 10 used in the following equation.

When the motion of the vehicle 10 is simply considered as the planar motion of the rigid body, the equations of motion in the lateral direction and the rotational direction are represented by the following equations (1) and (2), respectively. In equations (1) and (2), m represents the mass [kg] of the vehicle 10, V represents the speed [m/s] of the vehicle 10, and $I_z$ represents the yaw moment [kgm$^2$] acting on the vehicle 10, r represents the yaw rate [rad/s] of the vehicle 10, $\beta$ represents the vehicle body slip angle [rad], $K_f$ represents the cornering stiffness [N/rad] of the front wheels, $K_r$ represents the cornering stiffness [N/rad] of the rear wheels, $\alpha_f$ represents the slip angle [rad] of the front wheels, $\alpha_r$ represents the slip angle [rad] of the rear wheels, $l_f$ represents the distance [m] from the center of gravity of the vehicle 10 to the front wheel axle, and $l_r$ represents the distance [m] from the center of gravity of the vehicle 10 to the rear wheel axle.

$$mV(r + \dot{\beta}) = -2K_f\alpha_f - 2K_r\alpha_r \tag{1}$$

$$l_z\dot{r} = -2K_f\alpha_f l_f + 2K_r\alpha_r l_r \tag{2}$$

When the steering angles of the front wheels and the rear wheels are $\delta_f$, $\delta_r$, the slip angle $\alpha_f$ of the front wheels and the slip angle $\alpha_r$ of the rear wheels in equation (2) are expressed as equations (3) and (4) below, respectively.

$$\alpha_f = \beta + \frac{l_f r}{V} - \delta_f \tag{3}$$

$$\alpha_r = \beta + \frac{l_r r}{V} - \delta_r \tag{4}$$

Here, when there is a disturbance-input $T_y$ or the like in the yaw direction, the driving force (the force in the front-rear direction of the vehicle 10) generated in each of the drive wheels 11 needs to be set so that the resultant force acting on each of the drive wheels 11 is directed in the tangential direction with respect to the rotational direction of the vehicle 10. The driving force generated in each of the drive wheels 11 affects the equation of motion in the rotational direction of equation (2) among the equation of motion in the lateral direction of equation (1) and the equation of motion in the rotational direction of equation (2). In order to make the resultant force acting on each of the drive wheels 11 face in the tangential direction, it is conceivable to add a term constituted by the front-rear force simulating the first term on the right side and the second term on the right side of the equation (2) constituted by the lateral force. Considering these, the equation of motion in the rotational direction is expressed by the following equation (5).

$$l_z\dot{r} = -2K_f\alpha_f l_f + 2K_r\alpha_r l_r + 2K_{xl}s_{xl}\frac{t}{2} - 2K_{xr}s_{xr}\frac{t}{2} \tag{5}$$

In equation (5), $K_{xl}$ represents the driving stiffness [N/1] of the left wheel, $K_{xr}$ represents the driving stiffness [N/1] of the right wheel, $s_{xl}$ represents the slip ratio [−] of the left wheel, and $s_{xr}$ represents the slip ratio [−] of the right wheel. Note that the values of the driving stiffness and the cornering stiffness are treated as being substantially equal to each other.

Further, when the slip ratio $s_{xl}$, $s_{xr}$ of the wheels in the front-rear direction have a similar configuration to the slip angle $\alpha_f$, $\alpha_r$, the slip ratio $s_{xl}$ of the left wheel and the slip ratio $s_{xr}$ of the right wheel are represented by the following equations (6) and (7), respectively.

$$s_{xl} = s_d - \frac{\frac{v_{wr} - v_{wl}}{2}}{V} + \frac{t}{2}\frac{r'}{V} \tag{6}$$

-continued $$s_{xr} = s_d + \frac{\frac{v_{wr} - v_{wl}}{2}}{V} - \frac{t}{2}\frac{r'}{V} \tag{7}$$

In equations (6) and (7), $s_d$ represents the slip ratio of the translational diffusion portion based on the driver required driving force, $v_{wl}$ represents the rotational speed [rad/s] of the left wheel, $v_{wr}$ represents the rotational speed [rad/s] of the right wheel, and t represents the tread [m] of the vehicle 10. In equations (6) and (7), r' is a steady yaw rate estimated from the steering angle and the velocity of the vehicle 10, and is represented by, for example, the following equations (8) and (9). In equations (8) and (9), 1 represents the wheelbase [m]. Note that the steady yaw rate may be estimated based on a method other than the method using equation (8) and equation (9) as long as the steady yaw rate can be estimated with high accuracy.

$$r' = \frac{V}{l}\frac{1}{1 + AV^2}(\delta_f - \delta_r) \tag{8}$$

$$A = -\frac{m}{2l^2}\frac{l_f K_f - l_r K_r}{K_f K_r} \tag{9}$$

When the equations (1), (3) to (7) obtained in this manner are solved, the driving force $F_{x1}$ to $F_{x4}$ to be generated in the respective drive wheels 11 are obtained as in the following equations (10) to (13).

$$F_{x1} = \frac{w_1}{w}F_d - K_{x1}\left(-\frac{\frac{v_{w2} - v_{w1}}{2}}{V} + \frac{\frac{t}{2}r'}{V}\right) \tag{10}$$

$$F_{x2} = \frac{w_2}{w}F_d - K_{x2}\left(\frac{\frac{v_{w2} - v_{w1}}{2}}{V} - \frac{\frac{t}{2}r'}{V}\right) \tag{11}$$

$$F_{x3} = \frac{w_3}{w}F_d - K_{x3}\left(-\frac{\frac{v_{w4} - v_{w3}}{2}}{V} + \frac{\frac{t}{2}r'}{V}\right) \tag{12}$$

$$F_{x4} = \frac{w_4}{w}F_d - K_{x4}\left(\frac{\frac{v_{w4} - v_{w3}}{2}}{V} - \frac{\frac{t}{2}r'}{V}\right) \tag{13}$$

In equations (10) to (13), $F_{x1}$ to $F_{x4}$ represents the driving force to be generated in the first drive wheel 11-1 to the fourth drive wheel 11-4, respectively, $F_d$ represents the driver required driving force [N], w represents the vehicle weight [N], $w_1$ to $w_4$ represents the load [N] applied to the first drive wheel 11-1 to the fourth drive wheel 11-4, $K_{x1}$ to $K_{x4}$ represents the driving stiffness [N/1] of the first drive wheel 11-1 to the fourth drive wheel 11-4, and $v_{w1}$ to $v_{w4}$ represents the rotational speed [rad/s] of the first drive wheel 11-1 to the fourth drive wheel 11-4, respectively. The first term in the equations (10) to (13) indicates that the driver required driving force is distributed in proportion to the load applied to each wheel. The second term in equations (10) to (13) represents feedback control of the speed difference between the left and right drive wheels 11 with respect to the target yaw rate. In other words, the second term represents the difference between the speed difference between the pair of drive wheels 11 corresponding to the target yaw rate estimated from the steering angle of the vehicle 10 and the speed of the vehicle 10 and the actually measured speed difference between the pair of drive wheels 11 (converted into the slip ratio).

Further, when equations (10) to (13) are generalized, the driving force to be generated in each of the drive wheels 11 is expressed by the following equation (14).

$$F_{xn} = \frac{w_n}{w} F_d \pm K_{xn} \left( \frac{\frac{v_{wn'} - v_{wn}}{2}}{V} - \frac{\frac{t}{2} r'}{V} \right) \quad (14)$$

In equation (14), $F_{xn}$ represents a driving force [N] to be generated in the n-th drive wheel 11, $w_n$ represents a load [N] applied to the n-th drive wheel 11, $v_{wn}$ represents a rotational speed [rad/s] of the n-th drive wheel 11, $v_{wn'}$ represents a rotational speed [rad/s] of a drive wheels 11 which constitutes a pair with the n-th drive wheel 11, and $K_{xn}$ represents a driving stiffness of the n-th drive wheel 11.

The driving force control device according to the present embodiment sets the driving force calculated by using equations (10) to (14) as the driving force to be generated in each of the drive wheels 11. By generating the driving force set in this way in each of the drive wheels 11, a force is applied to each of the drive wheels 11 in the tangential direction with respect to the rotation direction of the vehicle 10 as illustrated in FIG. 4C.

Specific Control

Figures 6, 7:
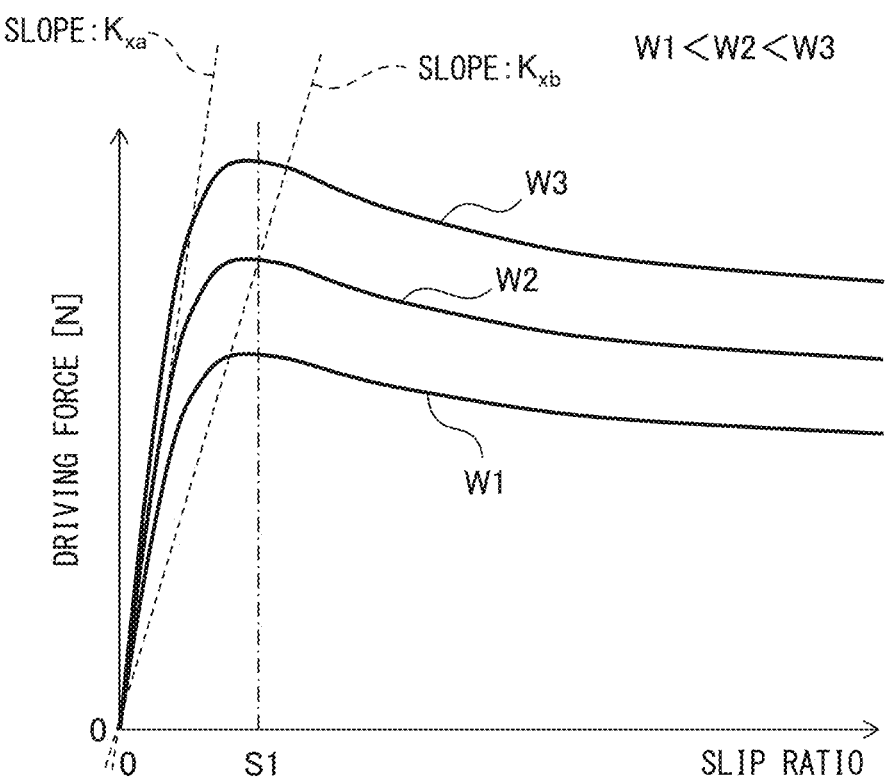
FIG. 6 is a flowchart illustrating a flow of control of a driving force of each drive wheel.
FIG. 7 is a diagram illustrating a relationship between a slip ratio, a load applied to each wheel, and a driving force.

Next, a specific control of the driving force of each of the drive wheels 11 will be described with reference to FIG. 6. FIG. 6 is a flowchart showing a flow of control of the driving force of each of the drive wheels 11. The control illustrated in FIG. 6 is executed in the processor 33 of the ECU 24 at regular time-intervals.

In the control of the driving force of the drive wheels 11, as shown in FIG. 6, the acquisition unit 331 first acquires values (detected values or estimated values) of various parameters required for setting the driving force (step S11). In the present embodiment, the acquisition unit 331 acquires the steering angle $\delta_f$, $\delta_r$ of each wheel, the rotational speed $v_{w1}$ to $v_{w4}$ of each wheel, the speed V of the vehicle 10, and the load $w_1$ to $w_4$ applied to each wheel.

Specifically, the steering angle $\delta_f$, $\delta_r$ of the respective wheels is detected by the steering angle sensor 21. When only the front wheels are used for steering, the steering angle $\delta_r$ of the rear wheels is constantly 0 [rad]. Further, the rotational speed $v_{w1}$ to $v_{w4}$ of the respective wheels is detected by the wheel speed sensor 22. In addition, the speed V of the vehicle 10 is estimated based on the acceleration detected by the acceleration sensor 23. Alternatively, the speed V of the vehicle 10 may be estimated based on the rotational speed of the four wheels detected by the wheel speed sensor 22 or based on the rotational speed of the four wheels and the acceleration detected by the acceleration sensor 23. Further, the load $w_1$ to $w_4$ applied to the respective wheels is estimated based on the acceleration detected by the acceleration sensor 23. In particular, in the present embodiment, the load $w_1$ to $w_4$ applied to each wheel is estimated so that the load applied to the wheel opposite to the direction in which the acceleration is generated increases. For example, when it is detected that the forward acceleration has occurred, the load applied to each wheel is estimated so that the load applied to the rear wheel increases.

Next, the driving force setting unit 332 sets the driving force to be generated in the respective drive wheels 11 based on the values of the various parameters acquired by the acquisition unit 331 (step S12). Specifically, the driving force to be generated in the respective drive wheels 11 is set using the above-described equations (10) to (13) based on the values of the various parameters acquired in the step S11.

Next, the control unit 333 controls the driving force of the respective drive wheels 11 so as to become the driving force set by the driving force setting unit 332 (step S13). Specifically, the control unit 333 controls the electric power supplied from the PCU 13 to each electric motor 12 so that the driving force of each drive wheel 11 becomes the set driving force.

Effect and Modification

According to the driving force control device of the present embodiment, the driving force of each of the drive wheels 11 is set by using the above-described equations (10) to (14). As a result, a force is applied to each of the drive wheels 11 in the tangential direction with respect to the rotational direction of the vehicle 10 as illustrated in FIG. 4C. As a result, the slip loss in each of the drive wheels 11 can be reduced, and the frictional force in each of the drive wheels 11 can be provided with a margin, so that the limit performance at the time of cornering and the stability against disturbance can be improved.

Further, in the driving force control device according to the present embodiment, the feedback gain is the driving stiffness when the feedback control is performed based on the second term in equations (10) to (14), and thus the feedback gain is determined in terms of design. Therefore, it is possible to eliminate a trial-and-error calibration operation for setting the feedback gain, and it is possible to greatly reduce the man-hours required for the calibration operation.

In the above-described embodiment, the driving stiffness $K_x$ is set to be constant. However, the driving stiffness $K_x$ may vary based on any parameter.

FIG. 7 is a diagram illustrating a relationship between a slip ratio, a load applied to each wheel, and a driving force. In particular, FIG. 7 shows the relation between the slip ratio and the driving force when different loads of W1, W2, W3 (W1<W2<W3) are applied to the respective wheels. As can be seen from FIG. 7, the driving force has non-linear characteristics with respect to the slip ratio and the load. Accordingly, the driving stiffness $K_x$ may be set based on the slip ratio and the load. For example, in the embodiment shown in FIG. 7, when the load applied to the wheels is W2, the driving stiffness $K_x$ may be set to $K_{xa}$ in the drawing in an area where the slip ratio is low, and when the slip ratio is high, for example, when the slip ratio is S1, the driving stiffness $K_x$ may be set to $K_{xb}$ in the drawing. In this case, the driving stiffness $K_x$ is set to be lower as the slip ratio is smaller, and is set to be lower as the load is smaller.

Further, even when the driving stiffness $K_x$ is set as a constant value, the driving stiffness $K_x$ may be set to a value (for example, $K_{xa}$) in a region where the slip ratio is low, or may be set to a value (for example, $K_{xb}$) in a region where the slip ratio is high to some extent.

Further, in the above-described embodiment, in deriving the equations (10) to (14), the driving stiffness and the cornering stiffness are treated as being substantially equal to each other. This is generally due to the fact that there are many wheels (tires) whose driving stiffness and cornering stiffness are close to each other. However, if the driving stiffness is used for the feedback gains in equations (10) to (14) in the case of wheels where these values deviate from each other so as not to be negligible, although the dissipation of the force due to the slippage of the wheels can be minimized, the direction of the force generated in each wheel deviates from the tangential direction with respect to the rotational direction of the vehicle 10. Therefore, a cornering stiffness $K_y$ may be used as the feedback gain in equations (10) to (14). Alternatively, an arbitrary value between the driving stiffness and the cornering stiffness may be used as the feedback gain as in equation (15) below.

$$F_{xn} = \frac{w_n}{w}F_d - (\varepsilon K_{xn} + (1 - \varepsilon)K_{yn})\left(-\frac{\frac{v_{wn'} - v_{wn}}{2}}{V} + \frac{\frac{t}{2}r'}{V}\right) \quad (15)$$

In equation (15), $\varepsilon$ is an arbitrary value from 0 to 1. $\varepsilon$ may be a predetermined constant value, or may be a value that changes in accordance with an operating condition. For example, when the vehicle 10 is configured to switch the driving mode between an eco mode that emphasizes fuel consumption and a sport mode that emphasizes motion characteristics, $\varepsilon$ is set to a value relatively close to 1 in the eco mode, and $\varepsilon$ is set to a value relatively close to 0 in the sport mode.

In addition, in the second term in equations (10) to (15), the speed difference between the pair of drive wheels 11 of the vehicle 10 is used. However, when one of the drive wheels 11 of the pair of drive wheels 11 is idling, the driving force effect by idling is set for both of the pair of drive wheels 11. Therefore, in the second term in equations (10) to (15), the difference between the rotational speed of each drive wheel 11 and the rotational speed corresponding to the speed of the vehicle 10 may be used instead of the speed difference between the pair of drive wheels 11. In this case, for example, the driving force generated in the first drive wheel 11-1 is set by the following equation (16). In equation (16), $v_{cog}$ represents the rotational speed of the wheel corresponding to the speed V of the vehicle 10.

$$F_{x1} = \frac{w_1}{w}F_d - K_{x1}\left(-\frac{\frac{v_{cog} - v_{w1}}{2}}{V} + \frac{\frac{t}{2}r'}{V}\right) \quad (16)$$

In any case, equation (14) can be expressed as equation (17) below, using a coefficient $K_n$ that varies according to at least one of driving stiffness and cornering stiffness. In equation (17), $v_{wn'}$ represents the rotational speed of the drive wheel 11 which constitutes a pair with the n-th drive wheel 11 or the rotational speed corresponding to the speed of the vehicle 10.

$$F_{xn} = \frac{w_n}{w}F_d \pm K_n\left(\frac{\frac{v_{wn'} - v_{wn}}{2}}{V} - \frac{\frac{t}{2}r'}{V}\right) \quad (17)$$

As described above, it can be said that the driving force setting unit 332 sets the driving force to be generated in the at least one pair of drive wheels 11, based on the calculated value obtained by multiplying the difference between the speed difference between the at least one pair of drive wheels 11 corresponding to the target yaw rate estimated from the steering angle and the speed of the vehicle acquired by the acquisition unit 331 and the difference between the speeds of the at least one pair of drive wheels 11 acquired by the acquisition unit 331 by the coefficient based on at least one of the cornering stiffness and the driving stiffness of each drive wheel.

Further, it can be said that the driving force setting unit 332 sets the driving force to be generated in at least one pair of the drive wheels 11, based on the value obtained by distributing the driver required driving force in proportion to the load applied to each vehicle and the calculated value.

While preferred embodiments according to the present disclosure have been described above, the present disclosure is not limited to these embodiments, and various modifications and changes can be made within the scope of the claims.

The invention claimed is:

1. A driving force control device for separately controlling a driving force of at least one pair of drive wheels of a vehicle, configured to:

acquire a detection value or an estimated value of a steering angle of the vehicle, a speed of each wheel including the drive wheels, and a speed of the vehicle;

set a driving force generated in each drive wheel;

control the driving force of each drive wheel so as to become a set driving force;

set a driving force to be generated in at least one pair of the drive wheels, based on a calculated value calculated by multiplying a difference between a speed difference between the at least one pair of drive wheels corresponding to a target yaw rate estimated from the acquired steering angle and the acquired speed of the vehicle and an acquired speed difference between the one pair of drive wheels by a coefficient based on at least one of a cornering stiffness and a driving stiffness of each drive wheel; and calculate the driving force Fxn of the drive wheels based on the following equation (1):

$$F_{xn} = \frac{w_n}{w}F_d \pm K_n\left(\frac{\frac{v_{wn'} - v_{wn}}{2}}{V} - \frac{\frac{t}{2}r'}{V}\right) \quad (1)$$

in the above equation (1), w represents the weight of the vehicle, wn represents the load applied to a n-th drive wheel, Fd represents the driving force required by the driver, vwn represents a speed of the n-th drive wheel, vwn' represents a speed of the drive wheel which is a pair with the n-th drive wheel, or the speed of the vehicle, V represents a speed of the vehicle, t represents a tread between the pair of drive wheels, and Kn represents a coefficient which varies according to at least one of a cornering stiffness and a driving stiffness of the n-th wheel.

2. The driving force control device according to claim 1, further configured to:

acquire a detection value or an estimated value of a load applied to each wheel, and set the driving force to be generated in the at least one pair of drive wheels, based on a value obtained by distributing the driver required driving force in proportion to a load applied to each of the wheels and the calculated value.

3. The driving force control device according to claim 1, wherein the coefficient is a value between the cornering stiffness and the driving stiffness.

4. The driving force control device according to claim 1, wherein the driving stiffness is set on the basis of a load applied to each wheel and a slip ratio.

\* \* \* \* \*